United States Patent [19]

Gourley

[11] Patent Number: 4,593,088

[45] Date of Patent: Jun. 3, 1986

[54] 2-AMINO-CINNAMOYLTHIOPHENE AZO DYES HAVING ANILINE, TETRAHYDROQUINOLINE, OR BENZOMORPHOLINE COUPLERS

[75] Inventor: Robert N. Gourley, Formby, England

[73] Assignee: Eastman Kodak Company, Rochester, N.Y.

[21] Appl. No.: 573,185

[22] Filed: Jan. 23, 1984

[30] Foreign Application Priority Data

Oct. 7, 1983 [GB] United Kingdom ............... 8326866

[51] Int. Cl.$^4$ .................. C09B 29/033; C09B 29/09; C09B 29/03; D06P 3/54
[52] U.S. Cl. ................... 534/768; 534/640; 534/753; 534/774; 534/777; 534/788; 534/794; 534/795; 534/588
[58] Field of Search ............ 260/152, 155; 534/753, 534/768, 788, 794, 795

[56] References Cited

U.S. PATENT DOCUMENTS

| | | | |
|---|---|---|---|
| 2,805,218 | 9/1957 | Towne et al. | 260/152 |
| 2,827,450 | 3/1958 | Towne et al. | 260/152 |
| 3,329,669 | 7/1967 | Sartori | 260/158 |
| 3,441,554 | 4/1969 | Hahn et al. | 260/158 |
| 4,101,543 | 7/1978 | Stiot et al. | 260/152 |
| 4,255,326 | 3/1981 | Giles et al. | 260/152 |
| 4,282,144 | 8/1981 | Weaver et al. | 260/152 |
| 4,400,318 | 8/1983 | Weaver et al. | 260/152 |
| 4,459,229 | 7/1984 | Weaver et al. | 260/152 |

FOREIGN PATENT DOCUMENTS

| | | | |
|---|---|---|---|
| 560335 | 7/1958 | Canada | 260/152 |
| 1351381 | 4/1974 | United Kingdom | 260/152 |
| 1351382 | 4/1974 | United Kingdom | 260/152 |
| 2041961 | 9/1980 | United Kingdom | 260/152 |

Primary Examiner—Floyd D. Higel
Attorney, Agent, or Firm—Donald W. Spurrell; Daniel B. Reece, III

[57] ABSTRACT

Disclosed are new disperse azo dyes prepared from 2-amino-cinnamoylthiophene compounds. These dyes give bright blue shades, for example, on polyester, cellulose acetate and other synthetic fibers and exhibit improvements in one or more of such properties as bathochromic shift, fastness to light, sublimation, chlorine, heat, ozone, gas, perspiration, crock, and wash, build, pH stability, bloom resistance, depth of shade, leveling, strike rate, migration, and the like. The dyes have the general formula:

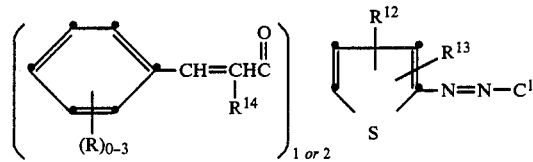

wherein each R is a substituent selected for example from alkyl, substituted alkyl, hydroxy, alkoxy, halogen, nitro, alkoxycarbonyl, alkanoyloxy, alkanoyl, cyano, alkylamino, and dialkylamino, $R^{14}$ is hydrogen or alkyl, $C^1$ represents an aniline, tetrahydroquinoline or benzomorpholine coupling component which may be extensively substituted, and each of $R^{12}$ and $R^{13}$ is hydrogen or a substituent such as acyl, acylamido, alkyl, halogen, and cyano.

9 Claims, No Drawings

2-AMINO-CINNAMOYLTHIOPHENE AZO DYES HAVING ANILINE, TETRAHYDROQUINOLINE, OR BENZOMORPHOLINE COUPLERS

This invention relates to new azo disperse azo dyes prepared from 2-amino-cinnamoylthiophene compounds. These dyes give bright blue to green shades, for example, on polyester, cellulose acetate and other synthetic fibers and exhibit improvements in one or more of such properties as bathochromic shift, fastness to light, sublimation, chlorine, heat, ozone, gas, perspiration, crock, and wash, build, pH stability, bloom resistance, depth of shade, leveling, strike rate, migration, and the like.

The new disperse dyes have the formula:

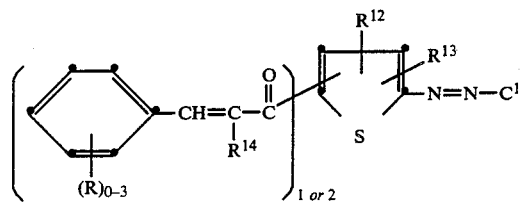

wherein each R is a substituent selected from alkyl, hydroxy, alkoxy, carboxy, halogen, nitro, alkoxycarbonyl, alkanoyloxy, alkanoyl, cyano, alkylamino, dialkylamino, and alkyl substituted with 1–3 of halogen, alkoxy, alkanoyl, alkanoyloxy, alkoxycarbonyl, alkanoylamino, cyano, nitro, carbamoyl, alkylcarbamoyl, sulfamoyl, alkylsulfamoyl, and the like; $C^1$ represents an aniline, tetrahydroquinoline or benzomorpholine coupling component which may be extensively substituted; $R^{12}$ and $R^{13}$ are each selected from H, alkyl, alkoxy, acyl, halogen, alkylsulfonyl, alkanoyloxy, $SO_2NH_2$, $SO_2NH$-alkyl, $SO_2N(alkyl)_2$, $CONH_2$, $CONH$alkyl, $CON(alkyl)_2$, arylsulfonyl, alkanoyl, acylamido, aroyl, aryl, alkylthio, arylthio, alkenylthio, alkoxycarbonyl, hydroxyalkylcarbamoyl, cyclohexylthio, $SO_3C_6H_5$, cyano, thiocyano, cyclohexylsulfonyl, cyclohexyl, and preferably alkanoyl, aroyl, alkoxycarbonyl, $CONH_2$, $CONH$alkyl, hydroxyalkylcarbamoyl, and alkyl substituted with 1–3 of alkoxy, CN, halogen, $SO_2$alkyl, CONHalkyl, alkanoyloxy, or $SO_2NH$alkyl; $R^{14}$ is hydrogen or alkyl.

Preferred dyes of the invention are those containing one cinnamoyl group, $R^{14}$ in that group being hydrogen and any R present being halogen, alkyl, alkoxycarbonyl, hydroxy, nitro, alkoxy, carboxy, alkanoyl, cyano, alkylamino or dialkylamino.

The coupler $C^1$ is preferably selected from those of the formulae:

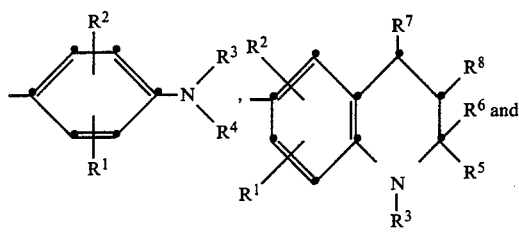

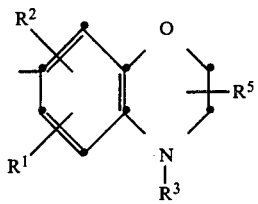

wherein
$R^1$ and $R^2$ are each selected from hydrogen, fluorine, chlorine, bromine, alkyl, cycloalkyl, alkoxy, phenoxy, alkylthio, arylthio, and radicals having the formula $-NH-X-R^9$ in which X is $-CO-$, $-OCO-$ $-COO-$, or $-SO_2-$ and $R^9$ is selected from alkyl and alkyl substituted with halogen, hydroxy, phenoxy, aryl, cyano, cycloalkyl, alkylsulfonyl, alkylthio, alkanoyloxy, and alkoxy, and when X is $-CO-$, $R^9$ also can be hydrogen, amino, alkenyl, alkylamino, dialkylamino, arylamino, aryl, or furyl;

$R^3$ and $R^4$ are selected from hydrogen; cycloalkyl; cycloalkyl substituted with one or two groups selected from alkyl, $-OH$, alkoxy, halogen and hydroxy substituted alkyl; phenyl or phenyl substituted with alkyl, alkoxy, halogen, alkanoylamino, cyano or alkoxycarbonyl; straight or branched alkenyl; straight or branched alkyl and such alkyl substituted with 1–3 of the following: hydroxy; halogen; cyano; amino; alkoxy; alkoxyalkoxy; hydroxy-alkoxy; succinimido; glutarimido; phenylcarbamoyl-oxy; phthalimido; phthalimidino; 2-pyrrol-idono; cyclohexyl; phenoxy; phenyl or phenyl substituted with alkyl, alkoxy, halogen, alkanoylamino, cyano or alkoxycarbonyl; alkanoylamino; sulfamoyl; alkylsulfamoyl; vinylsulfonyl; acrylamido; benzoylsulfonicimido; alkylsulfonamido; phenylsulfonamido; alkoxycarbonylamino; alkylcarbamoyloxy; alkoxycarbonyl; alkoxycarbonyloxy; alkenylcarbonylamino; groups of the formula $$\begin{array}{c} O \\ \| \\ -N \begin{array}{c} C-Y \\ | \\ C-CH_2 \\ \| \\ O \end{array} \end{array}$$

wherein y is $-NH-$, $-N-$alkyl, $-O-$, $-S-$, or $-CH_2O-$; $-S-R^{10}$ wherein $R^{10}$ is alkyl, phenyl, phenyl substituted with halogen, alkyl, alkoxy, alkanoylamino, cyano, or alkoxycarbonyl, pyridyl, pyrimidinyl, benzoxazolyl, benzimidazolyl, benzothiazolyl, or $$\begin{array}{c} N\!\!-\!\!-\!\!-\!\!-\!\!-N-R^{11}; \\ \| \\ -C \\ \diagdown_N \diagup CH \end{array}$$

$-OXR^9$; $-NH-X-R^9$; $-X-R^9$; $-CONR^{11}R^{11}$; $-SO_2NR^{11}R^{11}$; wherein $R^9$ and X are as defined above and each $R^{11}$ is selected from H, alkyl, and alkyl substituted with 1-3 of halogen, hydroxy, phenoxy, alkoxy, aryl, cyano, cycloalkyl, alkylsulfonyl, alkylthio, alkanoyl, and alkanoyloxy; alkoxy substituted with hydroxy, cyano, alkanoyloxy, or alkoxy; phenoxy substituted with one or more of alkyl, alkoxy or halogen;

or $R^3$ and $R^4$ combined form pentamethylene, ethyleneoxyethylene or ethylenesulfonylethylene which, with the nitrogen atom to which it is attached, forms a ring; and $R^5$, $R^6$, $R^7$ and $R^8$ are each selected from hydrogen and alkyl. All of the above alkyl, alkylene, alkenyl, and alkoxy moieties or substituents within the definitions of $R^1$ through $R^{11}$ preferably contain up to six carbons.

Preferred couplers $C^1$ of the above formulae are those in which the various substituents have the following values: $R^1$ is alkyl, alkoxy, alkanoylamino or alkoxycarbonylamino; $R^2$ is hydrogen or an alkyl or alkoxy group; each of $R^3$ and $R^4$ is hydrogen, an alkyl group or an alkyl group substituted with 1 to 3 of hydroxy, alkoxy, alkoxyalkoxy, hydroxylkoxy, carbamoyl, alkylcarbamoyl, alkanoylamino, sulfamoyl, alkylsulfamoyl, phenyl, cyclohexyl, 1-(2-pyrollidono), phthalimidino, succinimido, cyano, phenoxy, alkylsulfonyl, phthalimido, o-benzoicsulfimido, triazolylthio, alkylsulfonamido, —$SO_2NHR^{11}$, phenylsulfonamido, alkoxycarbonylamino, alkylcarbamoyloxy, alkoxycarbonyl, alkoxycarbonyloxy and

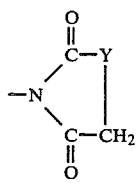

wherein Y is —NH—, —$CH_2$—O— or —S—; and each of $R^5$ and $R^7$ hydrogen or alkyl.

The couplers are prepared by procedures well known in the art as shown in the patent literature, e.g., U.S. Pat. Nos. 2,805,218; 2,827,450; and 2,839,523. The dyes of the present invention are readily prepared, for example, by reacting the known azo dyes derived from 2-amino-5-acetyl thiophene and the aforesaid couplers, with benzaldehyde or a substituted benzaldehyde in acetic acid in the presence of concentrated sulphuric acid.

The invention will be further understood from the following examples.

EXAMPLE 1

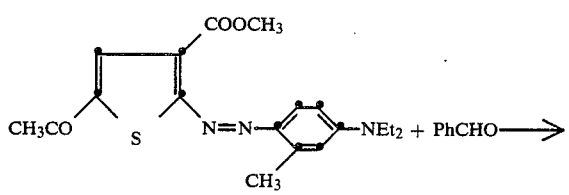

(I)

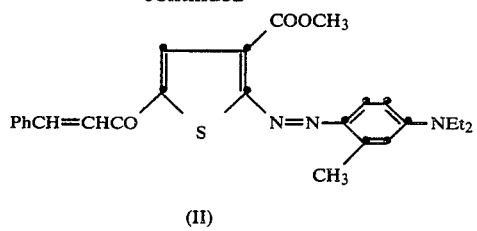

(II)

Dye (I) was prepared by diazotizing 5-acetyl-2-amino-3-methoxycarbonyl-thiophene and coupling with N,N-diethyl-m-toluidine in known manner.

A mixture of dye I (2 g.), benzaldehyde (1.5 g.), acetic acid (25 ml.) and concentrated sulphuric acid (5 ml.) was stirred at 100° C. for 1.5 hours. The reaction mixture was poured into dilute ammonium acetate solution, and the product dye (II) filtered off, washed with water and dried. The yield of dye (II) was 2.5 g.

This dye when applied to polyester or its blends by known techniques such as given below, gives bright blue shades with good dyeing and fastness properties.

By using the above procedure with the same diazo compound but with the couplers and benzaldehyde type reactants tabulated below, further dyes of the invention are obtained.

| Coupler | Benzaldehyde Type Compound |
|---|---|
| N,N—Diethyl-m-toluidine | 4-Chlorobenzaldehyde |
| N,N—Diethylaniline | Benzaldehyde |
| N,N—Diethyl-m-toluidine | 4-Methylbenzaldehyde |
| N,—Ethyl-o-toluidine | Benzaldehyde |
| 2,5-Dimethyl-N—ethyl aniline | Benzaldehyde |
| N—Ethyl-N—hydroxyethyl aniline | Benzaldehyde |
| N,N—Diethyl-m-toluidine | 4-Carbomethoxy-benzaldehyde |
| N—Ethyl-2,7-dimethyl tetrahydroquinoline | Benzaldehyde |
| N,N—Diethyl-2,5-dimethoxyaniline | Benzaldehyde |
| N—Ethyl-3,6-dimethyl-1,4-benzomorpholine | Benzaldehyde |
| N,N—Diethyl-m-toluidine | 4-Hydroxybenzaldehyde |

EXAMPLE 2

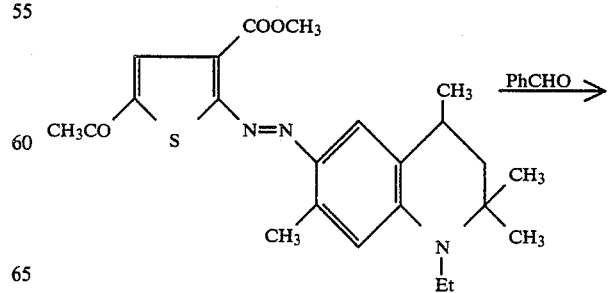

(III)

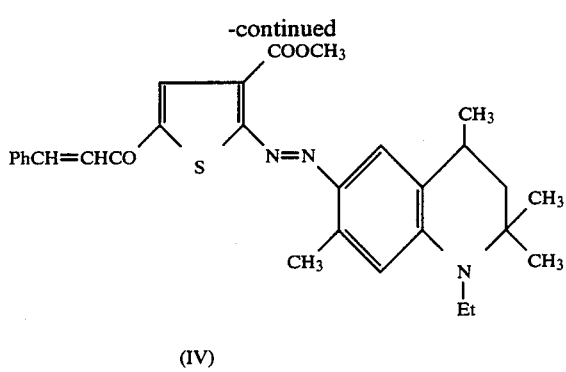

(IV)

Dye (III) was prepared by diazotising the known 2-amino-3-carbomethoxy-5-acetyl thiophene and coupling with N-ethyl 2,2,4,7-tetramethyl tetrahydroquinoline by the standard procedure.

A mixture of dye (III) (2 g) benzaldehyde (1.5 g), acetic acid (25 ml) and concentrated sulphuric acid (5 ml) was stirred at 100° C. for 1.5 hours. The reaction mixture was poured into cold water and the product dye (IV) filtered off, washed with water and dried. The yield of dye (IV) was 2.2 g.

The dye (IV) obtained when applied to nylon, polyester or other synthetic fibres by known techniques gave bright blue shades with good dyeing and fastness properties.

The dyeing of the fibre material may be carried out for example from an aqueous suspension in the presence of carriers at between about 80° and 100° C., in the absence of carriers between about 100°–130° C., or using the so-called thermofixing process at about 180°–230° C. Printing of the material can be carried out by steaming the goods, printed with the new dyestuffs, in the presence of a carrier at temperatures between 80° and 110° C. or in the absence of a carrier at 110°–140° C., or also by treating the printed material according to the thermofixing process at 180°–230° C.

A typical general procedure by which polyester, e.g., poly(ethylene terephthalate) can be dyed with the present dyes is as follows: The dye cake is dispersed by heating and agitating a dyepot containing the dye cake and methyl cellosolve. When the dyecake has been ground free of lumps and dissolved as much as possible in the methyl cellosolve, 2% based on weight of the fabric of Igepon T-51 and 2.0% based on weight of the fabric of sodium lignin sulfonate from a premixed solution of the two components is added. Sufficient demineralized water is added to make about a 30:1 bath ratio of water to dye and a small amount of 'Versene 100' (trade mark—sodium salt of ethylenediamine-tetracetic acid and 'Tanalon JDM-72' (trade mark—dye carrier) are added. The pH of the dye bath is adjusted to about 5.0 with acetic acid. The fabric samples (wet-out) are entered into the dyepot and the entire contents thereof entered into a pressure dyeing container. The container is sealed and entered into a High Temperature Launder-Ometer which is heated to 49° C. and rotation thereof started. The temperature of the Launder-Ometer is raised to 129° C. at the rate of about 2.8° C. per minute, and maintained at this temperature for 1 hour. The Launder-Ometer is then cooled, and the fabric samples removed and scoured in demineralized water containing 1 g/l of neutral soap and 1 g/l sodium carbonate. The samples are rinsed in cold demineralized water and dried at 121° C. in a forced air oven.

The following tables show exemplary dyes of the present invention wherein the —OCO— groups are oriented either —COO— or —OOC—.

TABLE 1

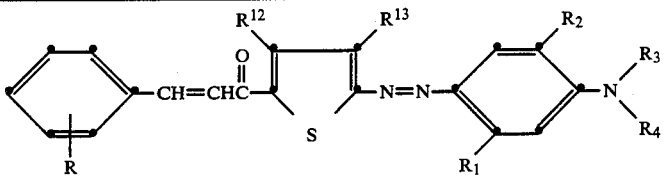

| R | $R^1$ | $R^2$ | $R^3$ | $R^4$ | $R^{12}$ | $R^{13}$ |
|---|---|---|---|---|---|---|
| H | H | H | $CH_2CH_3$ | $CH_2CH_2OCOCH_3$ | H | H |
| H | H | H | $CH_2CH_3$ | $CH_2CH_2CN$ | H | $COCH_3$ |
| H | H | H | $CH_2CH_2OCOCH_3$ | $CH_2CH_2OCOCH_3$ | H | $CH_3$ |
| H | H | H | $CH_2CH_2CN$ | $CH_2CH_2OH$ | H | $OC_2H_5$ |
| H | H | H | $CH_2CH_2CN$ | $CH_2CH_2OCOCH_3$ | Cl | Cl |
| H | H | H | $CH_2CH_2CN$ | $CH_2CH_2CN$ | H | $SO_2CH_3$ |
| H | H | H | $CH_2CH_3$ | $CH_2CH_2OH$ | H | $COOCH_3$ |
| H | H | H | $CH_2CH_3$ | $CH_2CH_2-N\underset{\underset{O}{\|\|}}{\overset{\overset{O}{\|\|}}{\diagdown}}$ | H | $SO_2NH_2$ |
| H | H | H | $CH_2CH_2CN$ | $CH_2CH_2OCOC_6H_5$ | H | $SO_2NHCH_3$ |
| 4-Cl | H | H | $CH_2CH_2CN$ | $CH_2CH_2CH_2CH_3$ | H | $SO_2N(C_2H_5)_2$ |
| 4-$CH_3$ | H | H | $CH_2CH_3$ | $CH_2C_6H_5$ | H | $CONH_2$ |
| H | H | H | $C_6H_{11}$ | $CHCHCH_2OH$<br>$\|$<br>$OH$ | H | $CONHCH_3$ |
| H | H | H | $C_6H_{11}$ | $CH_2CH_2OH$ | H | $CON(CH_3)_2$ |
| H | H | H | $C_6H_{11}$ | $CH_2CH_3$ | H | $SO_2C_6H_5$ |

TABLE 1-continued

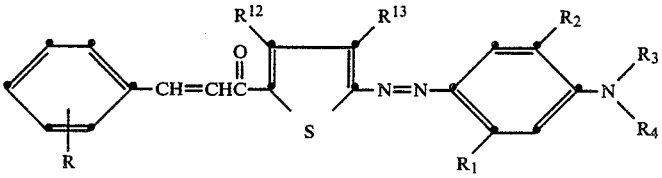

| R | R¹ | R² | R³ | R⁴ | R¹² | R¹³ |
|---|----|----|----|----|------|------|
| H | H | H | CH₂CH₃ | CH₂CH₃ | H | SO₂C₆H₅ |
| H | H | H | CH₂CH₂OCH₃ | CH₂CH₂COOCH₃ | H | NHCOCH₃ |
| H | CH₃ | H | CH₂CH₂OH | CH₂CH₂OH | CH₃ | OC₆H₅ |
| H | CH₃ | H | CH₂CH₂OH | CH₂CH₃ | CH₃ | C₆H₅ |
| H | CH₃ | H | CH₂CH₂OCOCH₃ | CH₂CH₂OCOCH₃ | CH₃ | SC₆H₅ |
| H | CH₃ | H | CH₂CH₃ | CH₂CHCH₂OH (OH) | CH₃ | SCH₂CH=CH₂ |
| 4-OCOCH₃ | CH₃ | H | CH₂CH₃ | CH₂CH₂CN | CH₃ | SC₆H₁₁ |
| H | CH₃ | H | CH₂CH₃ | CH₂CH₂Cl | Cl | SO₃C₆H₅ |
| H | CH₃ | H | —CH₂CH₂SO₂CH₂CH₂— | | Cl | CN |
| H | NHCOCH₃ | H | CH₂CH₃ | CH₂CH₃ | Cl | SCN |
| 4-OH | NHCOCH₃ | H | CH₂CH₃ | CH₂CH₂CN | Cl | SCN |
| 4-Cl | NHCOCH₃ | H | CH₂CH₂OCOCH₃ | CH₂CH₂OCOCH₃ | H | SO₂C₆H₁₁ |
| 2-Cl | NHCOCH₃ | CH₃ | H | CH₂CH₂CN | H | SC₂H₅ |
| 4-NO₂ | NHCOCH₃ | CH₃ | H | CH(CH₃)CH₂CH₃ | H | COC₆H₅ |
| H | H | OCH₃ | H | C₆H₁₁ | H | COOCH₃ |
| 2-CH₃ | CH₃ | H | CH₂CH₃ | CH₂CH₂SO₂NH₂ | H | OOCCH₃ |
| 4-NO₂ | NHCOCH₃ | H | H | CH₂C₆H₁₁ | H | CONHCH₂CH₂OH |
| 2-Cl | NHCOCH₃ | H | H | CH₂CH₂OCH₃ | H | H |
| 2-OCH₃ | NHCOCH₃ | H | H | CHCH₃ (CH₂CO₂CH₂CH₃) | H | H |
| 4-OCH₃ | NHCOCH₃ | H | H | CH—CH₂CH(CH₃)₂ (CH₂CH(CH₃)₂) | H | H |
| 3-NO₂ | NHCOCH₃ | H | H | CH₂CH(CH₂)₄CH₂OH (OH) | H | H |
| 2-OH | NHCOCH₃ | H | H | CH(CH₃)CH₂CH₃ | H | CH₃ |
| H | H | CH₃ | H | C₆H₁₁ | H | CH₃ |
| H | H | H | H | CH₂CH₂CN | H | COOC₂H₅ |
| 2-CH₃ | H | H | CH₃ | CH₃ | H | COOC₂H₅ |
| 4-COOCH₃ | H | H | CH₂CH₃ | CH₂CH₃ | H | H |
| 4-CH₃ | H | H | CH₂CH₃ | CH₂C₆H₅ | H | CH₂OC₂H₅ |
| 2-OCH₃ | H | H | CH₂CH₃ | C₆H₁₁ | H | CH₂CH₂CN |
| 3-OCH₃ | H | H | CH₂CH₃ | CH₂CH₂OH | H | CH₂SO₂CH₃ |
| 4-OCH₃ | H | H | CH₂CH₃ | CH₂CH₂OCOCH₃ | H | CH₂COOCH₃ |
| 4-COOCH₃ | H | H | CH₂CH₃ | CH₂CH(OH)CH₂OH | H | CH₂COOCH₃ |
| 2-Cl | H | H | CH₂CH₃ | CH₂CH₂CN | H | CH₂CONHCH₃ |
| 4-Cl | H | H | CH₂CH₂CN | CH₂CH₂CN | H | CH₂SO₂NHCH₃ |
| 4-N(CH₃)₂ | H | H | CH₂CH₂CN | CH₂CH₂OH | H | H |
| 2-OH | H | H | CH₂CH₂CN | CH₂CH₂OCOCH₃ | H | H |
| 3-CN | H | H | CH₂CH₂CN | CH₂CH₂OCOC₆H₅ | H | COCH₃ |
| 4-CN | H | H | CH₂CH₂OH | CH₂CH₂OH | H | CH₃ |
| H | H | H | CH₂CH₂OCOCH₃ | CH₂CH₂OCOCH₃ | H | OC₂H₅ |
| 2-CH₃ | H | H | —CH₂CH₂SO₂CH₂CH₂— | | Cl | Cl |
| 2-OCH₃ | Cl | Cl | H | CH₂CH₂CN | H | SO₂CH₃ |
| H | CH₃ | H | CH₂CH₃ | CH₂CH—CH₂OCCH₃ (OCCH₃, O) (O) | H | COOCH₃ |
| H | CH₃ | H | CH₂CH₃ | CH₂CH₃ | H | SO₂NH₂ |
| 4-COOCH₃ | CH₃ | H | CH₂CH₃ | CH₂CH₂OH | H | SO₂NHCH₃ |
| H | CH₃ | H | CH₂CH₃ | CH₂CH₂NH₂ | H | SO₂N(C₂H₅)₂ |
| 3-OCH₃ | CH₃ | H | CH₂CH₃ | CH₂CH₂NH₂ | H | CONH₂ |
| 3-NO₂ | CH₃ | H | CH₂CH₂CN | CH₂CH₂NH₂ | H | CONHCH₃ |
| H | NHCOCH₃ | H | CH₂CH₃ | CH₂CH₃ | H | CON(CH₃)₂ |
| H | NHCOCH₃ | H | CH₂CH₃ | CH₂CH₂OCOCH₃ | H | SO₂C₆H₅ |
| H | NHCOCH₃ | H | CH₂CH₃ | (CH₂CH₂O)₂CH₂CH₃ | H | SO₂C₆H₅ |
| 4-N(C₂H₅)₂ | NHCOC₆H₅ | H | CH₂CH₃ | CH₂CH₂CONH₂ | H | NHCOCH₃ |

TABLE 1-continued

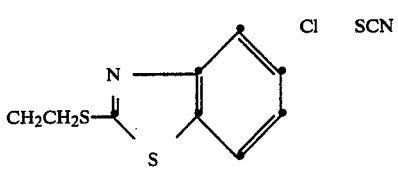

| R | R¹ | R² | R³ | R⁴ | R¹² | R¹³ |
|---|---|---|---|---|---|---|
| H | NHCOC$_6$H$_5$ | CH$_3$ | H | CH$_2$CH$_3$ | CH$_3$ | OC$_6$H$_5$ |
| H | NHCOCH$_3$ | OCH$_3$ | CH$_2$CH$_3$ | CH$_2$CH$_3$ | CH$_3$ | C$_6$H$_5$ |
| 2-CH$_3$ | NHCOCH$_3$ | OCH$_3$ | CH$_2$CH$_3$ | CH$_2$CH$_2$OCOCH$_3$ | CH$_3$ | SC$_6$H$_5$ |
| 4-CH$_3$ | NHCOCH$_3$ | OCH$_3$ | CH$_2$CH$_3$ | CH$_2$CH(OH)CH$_3$ | CH$_3$ | SCH$_2$CH=CH$_2$ |
| 2-OCH$_3$ | NHCOCH$_3$ | OCH$_3$ | CH$_2$CH$_2$OH | CH$_2$CH$_2$OH | CH$_3$ | SC$_6$H$_{11}$ |
| 2-OH | NHCOCH$_3$ | OCH$_3$ | CH$_2$CH$_2$OCOCH$_3$ | CH$_2$CH$_2$OCOCH$_3$ | Cl | SO$_3$C$_6$H$_5$ |
| 4-CO$_2$CH$_3$ | NHCOCH$_3$ | OCH$_3$ | CH$_2$CH$_3$ | C$_6$H$_{11}$ | Cl | CN |
| 2-Cl | NHCOCH$_3$ | H | CH$_2$CH$_3$ | CH$_2$CH$_2$OCNH—C$_6$H$_5$ (O) | Cl | SCN |
| 4-Cl | NHCOCH$_3$ | H | CH$_2$CH$_3$ | CH$_2$CH$_2$S—C(=N-aryl)S (benzothiazole-2-yl, methylated) | Cl | SCN |
| 4-Cl | CH$_3$ | H | CH$_2$CH$_3$ | CH$_2$CH$_3$ | H | COOCH$_3$ |
| 4-CH$_3$ | CH$_3$ | H | CH$_2$CH$_3$ | CH$_2$CH$_3$ | H | COOCH$_3$ |
| H | H | CH$_3$ | CH$_2$CH$_3$ | CH$_2$CH$_3$ | H | COOCH$_3$ |
| H | CH$_3$ | CH$_3$ | H | CH$_2$CH$_3$ | H | COOCH$_3$ |
| 4-COOH | CH$_3$ | H | CH$_2$CH$_3$ | CH$_2$CH$_3$ | H | COOCH$_3$ |
| 4-OH | CH$_3$ | H | CH$_2$CH$_3$ | CH$_2$CH$_3$ | H | CONH$_2$ |

TABLE II

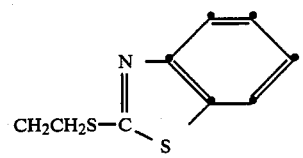

| R | R¹, R², R⁵, R⁶, R⁷, R⁸ | R³ | R¹² | R¹³ |
|---|---|---|---|---|
| H | 2,7-di-CH$_3$ | C$_2$H$_4$OH | H | H |
| H | 2,5-di-CH$_3$—8-OCH$_3$ | CH$_2$CH(OH)CH$_2$OH | H | COCH$_3$ |
| H | 2,2,4,7-tetra-CH$_3$ | C$_2$H$_4$CONH$_2$ | H | CH$_3$ |
| H | 2,2,4-tri-CH$_3$ | C$_2$H$_4$NHCOCH$_3$ | H | OC$_2$H$_5$ |
| H | 2-CH$_3$—7-NHCOCH$_3$ | C$_2$H$_4$CN | Cl | Cl |
| 2-CH$_3$ | 2,2,4-tri-CH$_3$—7-NHCOCH$_3$ | C$_2$H$_4$Cl | H | SO$_2$CH$_3$ |
| 4-OCH$_3$ | 2-CH(CH$_3$)$_2$—7-NHCOCH$_3$ | C$_2$H$_4$OCOCH$_3$ | H | COOCH$_3$ |
| H | 7-CH$_3$ | C$_2$H$_4$OC$_2$H$_5$ | H | SO$_2$NH$_2$ |
| 2-Cl | 2,2,4-di-CH$_3$—5,8-di-OCH$_3$ | C$_2$H$_4$NHCOCH=CH$_2$ | H | CON(CH$_3$)$_2$ |
| 4-Cl | 2,2,4-tri-CH$_3$—8-OCH$_3$ | CH$_2$C$_6$H$_5$ | H | SO$_2$C$_6$H$_5$ |
| 4-CO$_2$C$_2$H$_5$ | 2-CH$_3$—7-NHCOCH$_3$ | C$_2$H$_4$CONHCH$_2$OH | H | SO$_2$C$_6$H$_5$ |
| 4-Br | 2,7-di-CH$_3$ | C$_2$H$_5$ | CH$_3$ | OC$_6$H$_5$ |
| 2-CN | 2,5-di-CH$_3$—8-OCH$_3$ | C$_2$H$_4$SO$_2$NH$_2$ | CH$_3$ | C$_6$H$_5$ |
| 4-OCH$_3$ | 2,2,4,7-tetra-CH$_3$ | C$_2$H$_4$SO$_2$NHC$_2$H$_5$ | CH$_3$ | SC$_6$H$_5$ |
| 4-OH | 2,2,4-tri-CH$_3$ | C$_2$H$_4$SCH$_3$ | CH$_3$ | SCH$_2$CH=CH$_2$ |
| 2-OH | 2-CH$_3$—7-NHCOCH$_3$ | CH$_2$CH$_2$S—C(=N-tolyl)S | CH$_3$ | SC$_6$H$_{11}$ |

TABLE II-continued

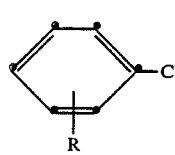

| R | R¹, R², R⁵, R⁶, R⁷, R⁸ | R³ | R¹² | R¹³ |
|---|---|---|---|---|
| 2-NO$_2$ | 2,2,4-tri-CH$_3$—7-NHCOCH$_3$ | 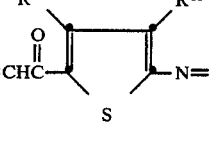 | Cl | SO$_3$C$_6$H$_5$ |
| H | 2,2,4-tri-CH$_3$—7-NHCOC$_2$H$_5$ | C$_2$H$_5$ | Cl | CN |
| H | 2-CH(CH$_3$)$_2$—7-NHCOCH$_3$ | 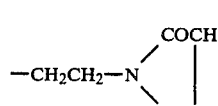 | Cl | SCN |
| H | 7-CH$_3$ | 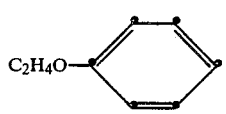 | Cl | SCN |
| 4-NO$_2$ | 3-CN—7-CH$_3$ | 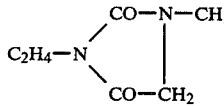 | H | SO$_2$C$_6$H$_{11}$ |
| H | 3-CONH$_2$—7-CH$_3$ | CH$_2$CHCH$_2$OH<br>       \|<br>      OH | H | SC$_2$H$_5$ |
| 4-N(CH$_3$)$_2$ | 3-Cl—7-CH$_3$ | 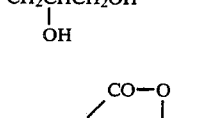 | H | COC$_6$H$_5$ |
| 4-N—(C$_2$H$_5$)$_2$ | 3-OCH$_3$—7-CH$_3$ | 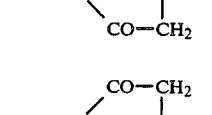 | H | COOCH$_3$ |
| 4-CH$_3$CO | 2,2,4-di-CH$_3$—5,8-di-OCH$_3$ | 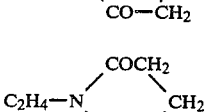 | H | OOCCH$_3$ |
| 2-NO$_2$ | 2,2,4-tri-CH$_3$—8-OCH$_3$ | 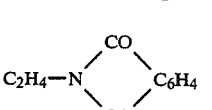 | H | CONHCH$_2$CH$_2$OH |
| 4-Cl | 2-CH$_3$—7-NHCOCH$_3$ | 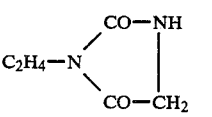 | H | H |
| 4-CH$_3$ | 3-OH—7-CH$_3$ | 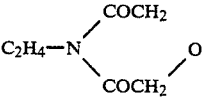 | H | H |

TABLE II-continued
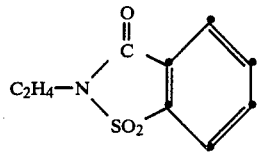
| R | R¹, R², R⁵, R⁶, R⁷, R⁸ | R³ | R¹² | R¹³ |
|---|---|---|---|---|
| 2-CH₃ | 2,7-di-CH₃ | 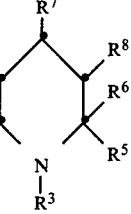 | H | H |
| 3-CH₃ | 2,5-di-CH₃—8-OCH₃ | 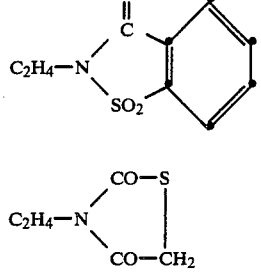 | H | H |
| 4-OCH₃ | 2,2,4,7-tetra-CH₃ | 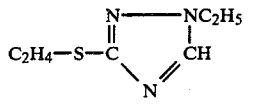 | H | CH₃ |
| 4-CN | 2,2,4-tri-CH₃ | 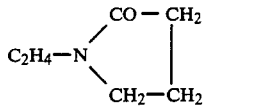 | H | H |
| H | 2-CH₃—7-NHCOCH₃ | 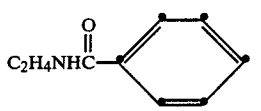 | H | COOC₂H₅ |
| H | 2,2,4-tri-CH₃—7-NHCOCH₃ | 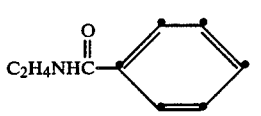 | H | H |
| H | 2-CH(CH₃)₂—7-NHCOCH₃ | 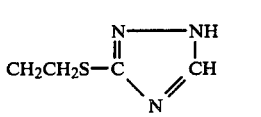 | H | H |
| H | 7-CH₃ | 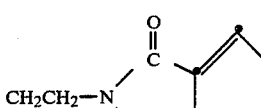 | H | CH₂OC₂H₅ |
| H | 3-CN—7-CH₃ | C₂H₄OH | H | CH₂CH₂CN |
| H | 3-CONH₂—7-CH₃ | 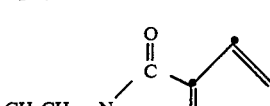 | H | CH₂SO₂CH₃ |
| H | 2,2,4,7-tetra-CH₃ | 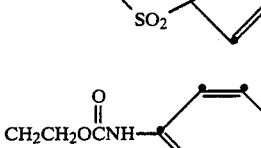 | H | CH₂COOCH₃ |

TABLE II-continued (structure with chalcone-thiazole-azo-tetrahydroquinoline; substituents R, R¹, R², R⁵, R⁶, R⁷, R⁸, R³, R¹², R¹³)

| R | R¹, R², R⁵, R⁶, R⁷, R⁸ | R³ | R¹² | R¹³ |
|---|---|---|---|---|
| H | 2,2,4,7-tetra-CH₃ | CH₂CH₂N(phthalimido) | H | CH₂OOCH₃ |
| 2-Cl | 2,7-di-CH₃ | C₂H₄OCOCH₃ | H | COOCH₃ |
| 4-Cl | 2,2,4,7-tetra-CH₃ | CH₂CH₃ | H | CONHC₂H₄OH |
| H | 2,2,4,7-tetra-CH₃ | CH₂CH₃ | CH₃ | COOC₂H₅ |

TABLE III (structure with chalcone-thiazole-azo-tetrahydroquinoline variant; substituents R, R¹, R², R⁵, R³, R¹², R¹³)

| R | R¹, R², R⁵ | R³ | R¹² | R¹³ |
|---|---|---|---|---|
| H | 3,6-di-CH₃ | C₂H₄OH | H | H |
| H | 3-CH₃ | CH₂CH(OH)CH₂OH | H | COCH₃ |
| H | 3-CH₃—6-NHCOCH₃ | C₂H₄CONH₂ | H | CH₃ |
| H | 6-NHCOCH₃ | C₂H₄NHCOCH₃ | H | OC₂H₅ |
| H | 3,6-di-CH₃ | C₂H₄CN | Cl | Cl |
| H | 3-CH₃ | C₂H₄Cl | H | SO₂CH₃ |
| H | 3-CH₃—6-NHCOCH₃ | C₂H₄OOCC₂H₅ | H | COOCH₃ |
| H | 6-NHCOCH₃ | C₂H₄OC₂H₅ | H | SO₂NH₂ |
| H | 3,6-di-CH₃ | C₂H₄CONHC₂H₅ | H | SO₂NHCH₃ |
| H | 3-CH₃ | C₂H₄CONHC₂H₅ | H | SO₂N(C₂H₅)₂ |
| H | 3-CH₃—6-NHCOCH₃ | C₂H₄CONHCH₂C₆H₅ | H | CONH₂ |
| H | 6-NHCOCH₃ | C₂H₄OCOC₂H₅ | H | CONHCH₃ |
| H | 3,6-di-CH₃ | C₂H₄NHCOCH=CH₂ | H | CON(CH₃)₂ |
| H | 3-CH₃ | CH₂C₆H₅ | H | SO₂C₆H₅ |
| H | 3-CH₃—6-NHCOCH₃ | C₂H₄CONHCH₂OH | H | SO₂C₆H₅ |
| H | 6-NHCOCH₃ | C₃H₆NHCONHC₂H₅ | CH₃ | NHCOCH₃ |
| H | 3,6-di-CH₃ | C₂H₅ | CH₃ | OC₆H₅ |
| H | 3-CH₃ | C₂H₄SO₂NH₂ | CH₃ | C₆H₅ |
| H | 3-CH₃—6-NHCOCH₃ | C₂H₄SO₂NHC₂H₅ | CH₃ | SC₆H₅ |
| H | 6-NHCOCH₃ | C₂H₄SCH₃ | CH₃ | SCH₂CH=CH₂ |
| H | 3,6-di-CH₃ | CH₂CH₂S—C(=N-benzothiazolyl) | CH₃ | SC₆H₁₁ |
| 2-CH₃ | 3-CH₃ | CH₂CH₂S—C(=N-triazolyl, NH-CH=N) | Cl | SO₃C₆H₅ |

TABLE III-continued

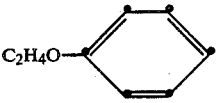

| R | R¹, R², R⁵ | R³ | R¹² | R¹³ |
|---|---|---|---|---|
| 4-CH₃ | 3-CH₃—6-NHCOCH₃ | CH₂CH₂—N(COCH₂)(COCH₂) (ring) | Cl | CN |
| 2-OCH₃ | 6-NHCOCH₃ | C₂H₄O—C₆H₄ | Cl | SCN |
| 4-OCH₃ | 3,6-di-CH₃ | C₂H₄—N(CO—N—CH₃)(CO—CH₂) (ring) | Cl | SCN |
| 2-NO₂ | 3-CH₃ | CH₂CHCH₂OH with OH | H | SO₂C₆H₁₁ |
| 4-NO₂ | 3-CH₃—6-NHCOCH₃ | C₂H₄—N(CO—O)(CO—CH₂) (ring) | H | SC₂H₅ |
| 2-Cl | 6-NHCOCH₃ | C₂H₄—N(CO—CH₂)(CO—CH₂) (ring) | H | COC₆H₅ |
| 2-OH | 3,6-di-CH₃ | C₂H₄—N(COCH₂)(CH₂)(COCH₂) (ring) | H | COOCH₃ |
| 4-N(CH₃)₂ | 3-CH₃ | C₂H₄—N(CO)(CO)—C₆H₄ (ring) | H | OOCCH₃ |
| 4-N(C₂H₅)₂ | 3-CH₃—6-NHCOCH₃ | C₂H₄—N(CO—NH)(CO—CH₂) (ring) | H | CONHCH₂CH₂OH |
| 4-COCH₃ | 6-NHCOCH₃ | C₂H₄—N(COCH₂)(O)(COCH₂) (ring) | H | H |
| 4-COOCH₃ | 3,6-di-CH₃ | C₂H₄—N(CO)(SO₂)—C₆H₄ (ring) | H | H |

TABLE III-continued

[Structure: Ar-CH=CH-C(=O)-[thiophene with R12, R13, CH3 groups, S]-N=N-[phenyl with R1, R2]-N(R3)-C(=O)-R5, where Ar is phenyl substituted with R]

| R | R¹, R², R⁵ | R³ | R¹² | R¹³ |
|---|---|---|---|---|
| 4-COOC₂H₅ | 3-CH₃ | C₂H₄-N(CO-S / CO-CH₂) | H | H |
| 2-CN | 3-CH₃—6-NHCOCH₃ | C₂H₄S-C(=N)-N(NC₂H₅)-CH=N | H | H |
| 4-CN | 6-NHCOCH₃ | C₂H₄-N(CO-CH₂ / CH₂-CH₂) | H | CH₃ |
| 2-OCH₃ | 3,6-di-CH₃ | C₂H₄NHC(=O)-C₆H₅ | H | CH₃ |
| 4-OCH₃ | 3-CH₃ | C₂H₄NHC(=O)-C₆H₄-OCH₃ | H | COOC₂H₅ |
| H | 3-CH₃—6-NHCOCH₃ | CH₂CH₂S-C(=N)-NH-CH=N | H | COOC₂H₅ |
| H | 6-NHCOCH₃ | CH₂CH₂-N(CO-C₆H₄-CH₂) | H | H |
| H | 3,6-di-CH₃ | C₂H₄OH | H | CH₂OC₂H₅ |
| H | 3-CH₃ | CH₂CH₂-N(CO-C₆H₄-SO₂) | H | CH₂CH₂CN |
| H | 3,6-di-CH₃ | CH₂CH₂OC(=O)NH-C₆H₅ | H | CH₂SO₂CH₃ |
| H | 3,6-di-CH₃ | CH₂CH₂CN | H | CH₂COOCH₃ |

The invention has been described in detail with particular reference to preferred embodiments thereof, but it will be understood that variations and modifications can be effected within the spirit and scope of the invention.

I claim:

1. A compound having the formula

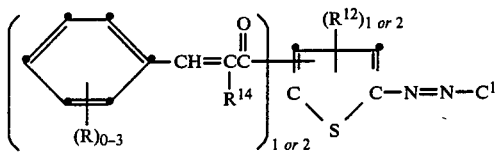

in which each R is a group selected from alkyl, hydroxy, alkoxy, carboxy, halogen, nitro, alkoxycarbonyl, alkanoyloxy, alkanoyl, alkylamino, cyano, dialkylamino, and alkyl substituted with 1-3 of halogen, alkoxy, alkanoyl, alkanoyloxy, alkoxycarbonyl, alkanoylamino, cyano, nitro, carbamoyl, alkylcarbamoyl, sulfamoyl, or alkylsulfamoyl; each $R^{12}$ is selected from H, alkyl, alkoxy, acyl, halogen, alkylsulfonyl, alkanoyloxy, $SO_2NH_2$, $SO_2NHalkyl$, $SO_2N(alkyl)_2$, $CONH_2$, CONHalkyl, $CON(alkyl)_2$, arylsulfonyl, alkanoyl, alkanoylamino, aroyl, aryl, alkylthio, arylthio, alkenylthio, alkoxycarbonyl, hydroxyalkylcarbamoyl, cyclohexylthio, $SO_3C_6H_5$, cyano, thiocyano, cyclohexylsulfonyl, cyclohexyl, and alkyl substituted with 1-3 of alkoxy, CN, halogen, $SO_2$alkyl, CONHalkyl or $SO_2N$-Halkyl; each $R^{14}$ is hydrogen or alkyl; and $C^1$ is an aniline, tetrahydroquinoline, or benzomorpholine azo type dye coupler selected from

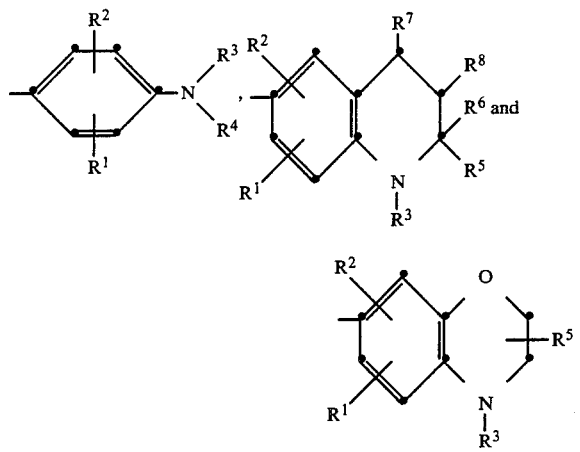

wherein:
$R^1$ and $R^2$ are each selected from hydrogen, fluorine, chlorine, bromine, alkyl, cycloalkyl, alkoxy, phenoxy, alkylthio, arylthio, and radicals having the formula —NH—X—$R^9$ in which X is —CO—, —OOC—, —COO—, or —$SO_2$— and $R^9$ is selected from alkyl and alkyl substituted with halogen, hydroxy, phenoxy, aryl, cyano, cycloalkyl, alkylsulfonyl, alkylthio, alkanoyloxy, or alkoxy, and when X is —CO—, $R^9$ is also selected from hydrogen, amino, alkenyl, alkylamino, dialkylamino, arylamino, aryl, or furyl;
$R^3$ and $R^4$ are selected from hydrogen; cycloalkyl; cycloalkyl substituted with one or two groups selected from alkyl, —OH, alkoxy, halogen and hydroxy substituted alkyl; phenyl or phenyl substituted with alkyl, alkoxy, halogen, alkanoylamino, cyano or alkoxycarbonyl; straight or branched alkenyl; straight or branched alkyl and such alkyl substituted with 1-3 of the following: hydroxy; halogen; cyano; amino; alkoxy; hydroxyalkoxy; succinimido; glutarimido; phenylcarbamoyloxy; phthalimido, phthalimidino; 2-pyrrolidono; cyclohexyl; phenoxy; phenyl or phenyl substituted with alkyl, alkoxy, halogen, alkanoylamino, cyano or alkoxycarbonyl; alkanoylamino; sulfamoyl; alkylsulfamoyl; vinylsulfonyl; acrylamido; benzoylsulfonicimido; alkylsulfonamido; phenylsulfonamido; alkoxycarbonylamino; alkylcarbamoyloxy; alkoxycarbonyl; alkoxycarbonyloxy; alkenylcarbonylamino; groups of the formula

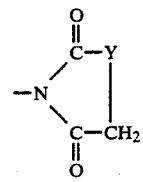

wherein Y is —NH—,

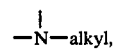

—O—, —S—, or —$CH_2O$—; —S—$R^{10}$ wherein $R^{10}$ is alkyl, phenyl, phenyl substituted with halogen, alkyl, alkoxy, alkanoylamino, cyano, or alkoxycarbonyl, pyridyl, pyrimidinyl, benzoxazolyl, benzimidazolyl, benzothiazolyl, or

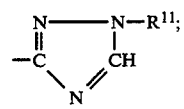

—$OXR^9$; —NH—X—$R^9$; —X—$R^9$; —$CONR^{11}R^{11}$; —$SO_2NR^{11}R^{11}$; wherein $R^9$ and X are as defined above and each $R^{11}$ is selected from H, alkyl, and alkyl substituted with 1-3 of halogen, hydroxy, phenoxy, alkoxy, aryl, cyano, cycloalkyl, alkylsulfonyl, alkylthio, alkanoyl, and alkanoyloxy; alkoxy substituted with hydroxy, cyano, alkanoyloxy, or alkoxy; phenoxy substituted with one or more of alkyl, alkoxy or halogen; or $R^3$ and $R^4$ combined form pentamethylene, ethyleneoxyethylene or ethylenesulfonylethylene which, with the nitrogen to which it is attached, forms a ring; and
$R^5$, $R^6$, $R^7$ and $R^8$ are each selected from hydrogen and alkyl.

2. A dye compound according to claim 1 wherein the coupler has the formula

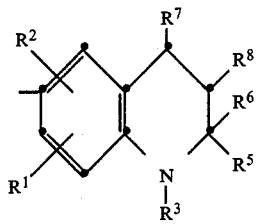

wherein $R^1$, $R^2$, $R^3$, $R^5$, $R^6$, $R^7$, and $R^8$ are as defined therein.

3. A compound of claim 1 wherein: $R^{12}$ and $R^{13}$ are each selected from alkanoyl, aroyl, alkoxycarbonyl, $CONH_2$, CONHalkyl, hydroxyalkylcarbamoyl, and alkyl substituted with 1-3 of alkoxy, CN, halogen, $SO_2$alkyl, CONHalkyl, alkanoyloxy or $SO_2NHalkyl$;

$R^1$ is alkyl, alkoxy, alkanoylamino, or alkoxycarbonylamino;
$R^2$ is hydrogen, alkyl, or alkoxy;
$R^3$ and $R^4$ are the same or different and selected from hydrogen, alkyl and alkyl substituted with 1 to 3 of hydroxy, alkoxy, alkoxyalkoxy, hydroxyalkoxy, carbamoyl, alkylcarbamoyl, alkanoylamino, sulfamoyl, alkylsulfamoyl, phenyl, cyclohexyl, 1-(2-pyrrolidono), phthalimidino, succinimido, cyano, phenoxy, alkylsulfonyl, phthalimido, o-benzoicsulfimido, triazolylthio, alkylsulfonamido, $-SO_2NHR^{11}$, phenylsulfonamido, alkoxycarbonylamino, alkylcarbamoyloxy, alkoxycarbonyl, alkoxycarbonyloxy,

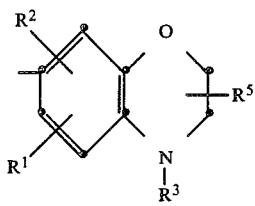

and $R^5$ and $R^7$ are each hydrogen or alkyl.

4. A dye compound according to claim 1 wherein the coupler has the formula

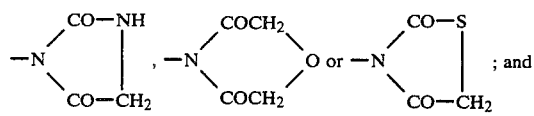

wherein $R^1$, $R^2$, $R^3$ and $R^5$ are as defined therein.

5. The compound of claim 1 having the formula

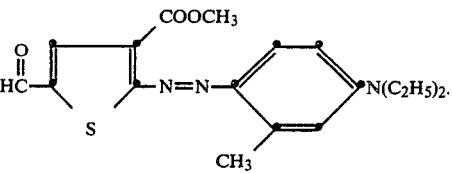

6. The compound of claim 1 having the formula

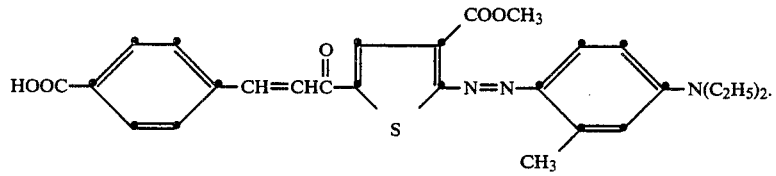

7. The compound of claim 1 having the formula

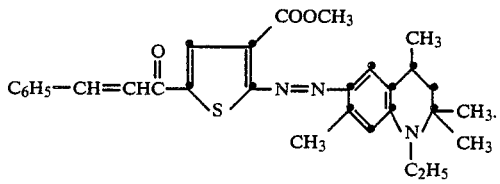

8. The compound of claim 1 having the formula

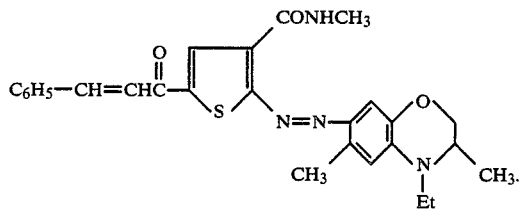

9. The compound of claim 1 having the formula:

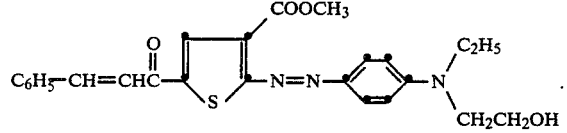

* * * * *